United States Patent
Biondo et al.

(10) Patent No.: US 9,100,797 B2
(45) Date of Patent: *Aug. 4, 2015

(54) WIRELESS LOCATING SYSTEM

(75) Inventors: William A. Biondo, Beverly Hills, MI (US); David T. Proefke, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1930 days.

This patent is subject to a terminal disclaimer.

(21) Appl. No.: 12/181,110

(22) Filed: Jul. 28, 2008

(65) Prior Publication Data

US 2010/0019925 A1    Jan. 28, 2010

(51) Int. Cl.
*H04W 4/04* (2009.01)
*B60R 25/00* (2013.01)
*G01S 5/18* (2006.01)

(52) U.S. Cl.
CPC ............... *H04W 4/046* (2013.01); *B60R 25/00* (2013.01); *G01S 5/183* (2013.01)

(58) Field of Classification Search
USPC .................. 340/539.32, 989, 825.49; 455/68; 701/213

See application file for complete search history.

(56) References Cited

U.S. PATENT DOCUMENTS

| | | | |
|---|---|---|---|
| 6,529,142 B2 | 3/2003 | Yeh et al. | |
| 6,774,787 B1 * | 8/2004 | Melbourne | 340/539.1 |
| 7,142,090 B2 | 11/2006 | Ueda et al. | |
| 2003/0134600 A1 * | 7/2003 | Picone et al. | 455/68 |

OTHER PUBLICATIONS

German Office Action for German Application No. 10 2009 034 453.5-31 mailed Dec. 3, 2010.

* cited by examiner

*Primary Examiner* — Jack K Wang

(74) *Attorney, Agent, or Firm* — Ingrassia Fisher & Lorenz, P.C.

(57) ABSTRACT

A method is provided for exchanging information to locate a key fob. The method comprises transmitting a wireless locator signal from a first portable wireless device, the wireless locator signal conveying the identity of the first portable wireless device and receiving a first once-adjusted wireless locator signal from a distant wireless device locator system, the first once-adjusted wireless locator signal comprising at least some information conveyed in the wireless locator signal.

20 Claims, 5 Drawing Sheets

WIRELESS LOCATING SYSTEM

TECHNICAL FIELD

Embodiments of the subject matter described herein relate generally to wireless key fobs and other wireless electronic devices. More particularly, embodiments of the subject matter relate to systems and methods for locating linked wireless electronic devices, such as automotive key fobs.

BACKGROUND

Some vehicles are associated with portable remote devices, such as key fobs that can allow remote manipulation of the associated vehicle. As one example, a key fob can be configured to wirelessly communicate with a vehicle to remotely unlock one or more door locks of the vehicle. In other examples, the portable remote device can unlatch or open the trunk or lift gate of a vehicle, activate or deactivate an alarm system, and/or initiate any other useful actions.

Remote devices can be easy to carry and transport in personal containers, such as purses, pockets, wallets, and the like. Accordingly, as with other personal effects, key fobs and other portable remote devices can be lost or misplaced or can be otherwise difficult to find. Even with careful tracking of a remote device, children and pets, among other factors, can make location difficult. Moreover, multiple remote devices are often distributed with each vehicle. In the event that more than one remote device becomes lost or misplaced, finding them again can require additional effort.

BRIEF SUMMARY

A method is provided for exchanging information to locate a key fob. The method comprises transmitting a wireless locator signal from a first portable wireless device, the wireless locator signal conveying the identity of the first portable wireless device, and receiving a first once-adjusted wireless locator signal from a distant wireless device locator system, the first once-adjusted wireless locator signal comprising at least some information conveyed in the wireless locator signal.

A method of locating portable wireless devices is also disclosed. The method comprises receiving a wireless locator signal with a first portable wireless device comprising a feedback device, the wireless locator signal conveying information including the identity of a distantly-transmitting remote wireless locator system, determining the identity of the remote wireless locator system from the wireless locator signal, and operating the feedback device, in response to receiving the wireless locator signal, to generate feedback that identifies the remote wireless locator system.

A method of locating a key fob associated with a vehicle comprising a remote device locator system is also disclosed. The method comprises transmitting a wireless locator signal from a first key fob in response to manipulation of a first manual input device of the first key fob, receiving a first once-adjusted wireless locator signal from a second key fob, the first once-adjusted wireless locator signal including the identity of the second key fob and at least some information conveyed in the wireless locator signal, and operating a first feedback device of the first key fob in a first mode in response to receiving the first once-adjusted wireless locator signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. For example, an embodiment may employ various integrated circuit components, e.g., memory elements, digital signal processing elements, logic elements, look-up tables, or the like, which may carry out a variety of functions under the control of one or more microprocessors or other devices.

Figure 1:
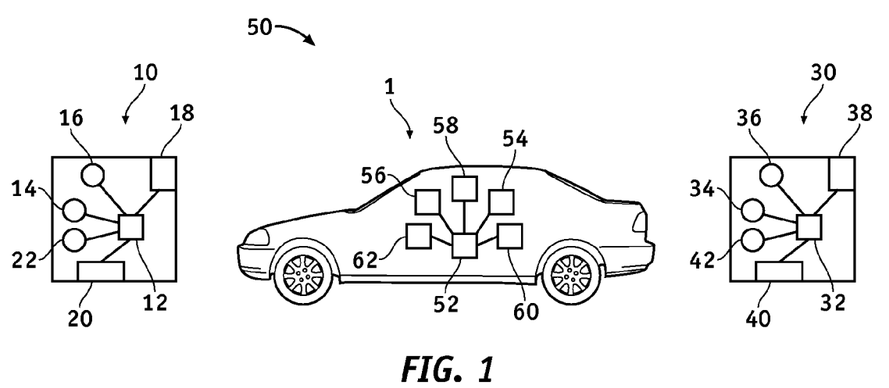
FIG. 1 is a schematic illustration of an embodiment of the components of a remote device locating system.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements in a vehicle and/or remote locator device, additional intervening elements, devices, features, or components may be present in an embodiment of the depicted subject matter.

The terms "first", "second" and other such numerical terms referring to structures do not imply a sequence or order unless clearly indicated by the context.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Such representations may be shown with respect to wireless transmission of data between some portions of embodiments.

In accordance with the system embodiments described herein, lost or misplaced key fobs can be easily located. A system may include key fobs associated with a vehicle; the key fobs are adapted to activate user feedback devices. The feedback devices can aid a user of the system in locating lost or misplaced key fobs by emitting audible and/or visual signals. A locator signal can be initially transmitted from a key fob or the vehicle. Such a locator signal can begin the search for lost or misplaced key fobs. Multiple devices or systems can transmit a locator signal. Additionally, the key fobs and associated vehicle are capable of retransmitting locator signals, enabling a key fob outside the initial transmission range of the locator signal to receive a retransmitted signal, thus spreading the area in which key fobs can be located.

FIG. 1 illustrates an embodiment of a remote device locating system 1. The locating system 1 can include a first remote device 10, a second remote device 30, and a wireless locating device 50 disposed in, coupled to, or cooperating with a vehicle, among other components as appropriate to the embodiment. The first and second remote devices 10, 30 can be embodied in wireless key fobs, though alternatively items such as keys, key storage devices, personal devices, wallets, purses, money clips, cellular or portable phones, wireless communication devices, and/or any portions of any of these objects, devices, and systems can be used. Similarly, although the wireless locating device 50 is embodied in a vehicle in the illustrated embodiment, it can be embodied in or cooperate with other components, devices, or systems, such as desktop computers, microphone broadcast bases, wireless broadcast devices, or other systems and/or components can be used. Additionally, although two remote devices 10, 30 are illustrated, more or fewer can be used as appropriate.

The first remote device 10 can include a control system 12, a manual input device 14, a feedback device 16, and a wireless transceiver 18, among other components. Some embodiments can also include a display 20 and/or another manual input device 22. The components of the first remote device 10 can be coupled together as needed using any suitable interconnection technique or technology. The first remote device is suitably configured to receive, process, and otherwise respond to various wireless signals handled or transmitted by the system 1, such as, without limitation, locator signals, key fob command or request signals, response signals, and the like. The first remote device 10, moreover, is capable of supporting the various key fob locating techniques and protocols described in more detail below, with reference to FIGS. 2-10.

Each manual input device 14, 22 can comprise any suitable mechanism for inputting information into a remote device or vehicle. Some non-limiting examples can include buttons, knobs, switches, touch-sensitive devices, and the like.

The feedback device 16 can comprise a component adapted to produce a signal, cue, effect, or indicator perceptible by one of the five senses, such as a visual feedback device, an audible feedback device, a tactile feedback device, and the like, among other components of the device. A constant light, a flashing or blinking light, either of which can emit from an operated light emitting diode (LED), a group of such lights, and/or lights flashing synchronously or asynchronously are some non-limiting examples of visual feedback devices. A visual feedback device can emit a signal, pattern, icon, and/or sequence or pattern thereof, either singly or repetitively. Visual feedback can be displayed for constant or varying time intervals.

Similarly, an audible feedback device can be one which produces any of various sounds detectable by the human ear, such as a synthesized voice, audible tone, siren, beeping noise, and/or combinations and/or variations thereof. In some embodiments, a constant or intermittent tone can be produced by a feedback device. In certain embodiments, different audible feedback indicators can be produced to indicate, convey, or represent different states, responses, and feedback of the remote device locator system. As one example, a higher-pitched tone can be emitted under certain circumstances, while a lower-pitched tone can be emitted under different circumstances. In some embodiments, the audible feedback device can also emit alternating tones.

The feedback device 16 can also comprise a tactile feedback device, such as a buzzer or vibrating mechanism adapted to operate for intervals of varying lengths, intensity, and in patterns. Some or all of the types of feedback devices can be embodied in different combinations and can operate in any combination of modes, such as a flashing light paired with a vibration device. In other embodiments, a steady light, low-pitched tone, and gentle vibration can all be created by a feedback device, and so on.

The wireless transceiver 18 is any device, component, or system capable of transmitting and receiving wireless signals, such as wireless locator signals, adjusted or rebroadcasted wireless locator signals, key fob confirmation, command, and request signals, and the like, and described below. Any suitable protocol and/or method of interoperation can be used. Some types of wireless transceivers 18 can operate on radio frequency (RF), infrared and/or other portions of the electromagnetic spectrum, including spread-spectrum technologies. The transceiver 18 can be adapted to interoperate with any other transceiver of the system as well as other wireless devices, as suitable to the embodiment. Additionally, a transceiver controlled by a control system and the communication between them may correspond to some or all of the features described above. A control system can receive input from multiple sources and/or components, as well as transmit signals to other components, thereby allowing control of the components and directed operation of their features and functions.

The display 20 can be embodied separate from and/or in addition to the feedback device 16. Preferably, the display 20 is adapted to display icons or imagery associated with other components in the system 1. As one example, where a device locator signal exchange has established contact with a lost or misplaced key fob, the display 20 can create, illuminate, or show a icon or graphic or other image conveying which components of the system 1 have responded to the device locator signal, or that none have, as appropriate to the circumstances. One such display can be adapted to produce graphic imagery, though alphanumerical output can also be used. Some non-limiting examples of displays can include liquid crystal displays (LCD), organic light emitting diode displays (OLED), and the like. Any display suitable to the remote device can be used.

The control system 12 can be coupled to one or more of the elements in a remote device 10, as shown in FIG. 1. As shown in the illustrated embodiment of the first remote device 10, the control system 12 is coupled to the either manual input device 14, 22, the feedback device 16, the wireless transceiver 18, and the display 20. The control system 12 can be adapted to monitor, regulate, control, and respond to the transmission and reception of signals to or from any component or element to which it is coupled. Each signal can convey information, such as a notification of activation of a manual input device, an activation of a feedback device, and information being transmitted or received through a wireless transceiver. Such signals can include those listed above and described in further detail below.

The second remote device and wireless locator device 30, 50 can similarly comprise control systems 32, 52, manual input devices 34, 42, 54, 62 a feedback devices 36, 56, wireless transceivers 38, 58 and, in some embodiments, displays 40, 60 similar to those described in relation to the first remote device 10.

Preferably, the system 1 is used to locate a lost or misplaced component of the system. As one example, the first remote device 10, called a known device, can be in possession of the operator. The operator can initiate a search for other components of the system 1. Such a search can be called a wireless search, a wireless device location search, a wireless location search or request, and so on. To initiate the search, the operator can manipulate the manual interface device 14 of the known device. In response, the known device will transmit a wireless locator signal conveying information containing the identity of the transmission, here the known device, and that a search has been requested.

In response, other components of the system 1 which receive the wireless locator signal can perform certain actions, such as operating a feedback device, and responding to the wireless locator signal. Preferably, the known device receives one or more signals from other components of the system 1 and can convey information regarding the outcome of the search to the operator using the feedback device 16 and/or display 20. Under certain circumstances, other components of the system 1 can display more or less information depending on the circumstances under which the search is requested.

Figure 2:
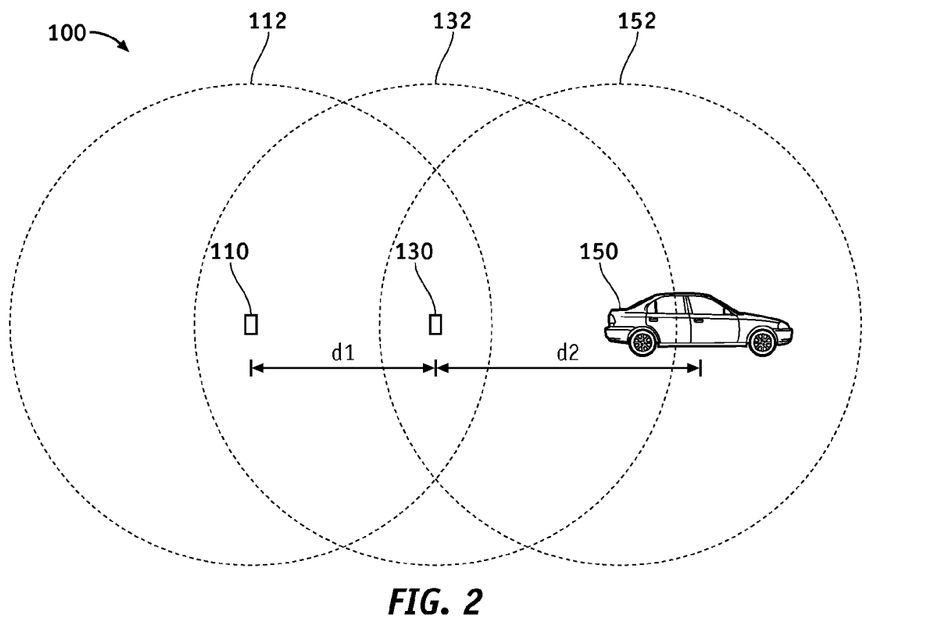
FIG. 2 is a diagram of an embodiment of a locating system disposed in a first configuration.

The effectiveness of the search can depend on a variety of factors, including power available for signal transmission, distance between components of the system 1, interference from other sources, obstacles inhibiting signal transmission, low power for transmissions, and so on. The success of the search can depend, at least in part, upon distance between components of the system 1. As shown in FIG. 2, however, a component does not need to be within transmission range of the known device to respond to a wireless locator signal.

FIG. 2 displays a diagram of a locator system 100 comprising a first remote device 110, a second remote device 130, and a vehicle comprising or cooperating with a wireless locating device 150, similar to those described above. The first remote device can have a first broadcast range 112, while the second remote device 130 can have a second broadcast range 132, and the wireless locating device 150 can have a third broadcast range 152. Each broadcast or transmission range 112, 132, 152 can be a distance the originating component is capable of transmitting a signal with reasonable chance a receiving component will acquire the information conveyed therein. The first remote device 110 can be separated from the second remote device 130 by a distance d1, which can be less than the range of the first and second broadcasts 112, 132. Similarly, the second remote device 130 can be separated from the wireless locating device 150 by a distance d2, which can be less than the range of the second and third broadcasts 132, 152. The total distance between the first remote device 110 and the wireless locating device 150—the combination of d1 and d2—can be greater than any of the first, second, and third broadcast ranges 112, 132, 152. Consequently, in the illustrated embodiment, the first remote device 110 and wireless locating device 150 can communicate with each other using the second remote device 130 as an intermediary, but cannot directly communicate, such as with wireless transceivers.

In some circumstances, some components of the system 100 can be outside the broadcast range of some or every other device in the system 100. Additionally, in some circumstances, a component can receive from two other components of the system, but respond to only one or neither of the other components. Behavior of the system in such circumstances is described below.

Figure 3:
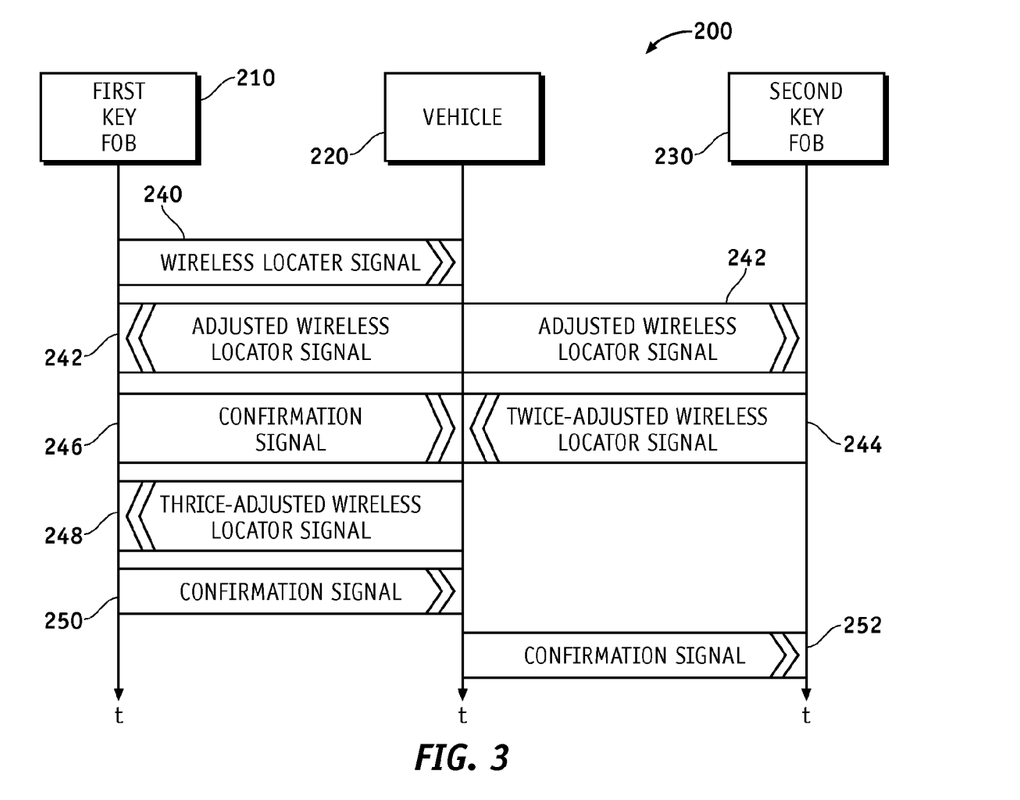
FIG. 3 is a schematic illustration of a sequence of signals corresponding to an embodiment.

With reference to FIG. 3, a diagram illustrating performance of a device search 200 is shown. Although a first key fob 210, vehicle 220, and second key fob 230 are used as exemplary embodiments, as described above, the wireless systems disposed or embodied therein can be alternatively embodied as well. Additionally, FIG. 3 illustrates a physical layout similar to that of FIG. 2, except that the first and second key fobs 210, 230 are spaced too distantly to directly communicate.

An operator can initiate a search for either a remote device, such as the key fobs described here. Initiating a search can be done by manipulating at least one of the manual interface devices of a key fob, as one example. Typically, such a search is performed to cause one or more components of the system to provide feedback, assisting the operator in locating them. For this example, the operator of 210 is attempting to locate the second key fob 230, in an unknown location and outside the transmission range of the first key fob 210. Under some circumstances, the operator can initiate a search for a vehicle, through interaction with a wireless device locator system embodied within, disposed within, or cooperating with the vehicle. Although feedback modes may vary depending on the component, the operation of the search, for the embodiment illustrated in FIG. 3, may be as described below.

The operator can initiate the search by manipulating a button or other device of the first key fob 210, a known device. In response, the first key fob 210 transmits a wireless locator signal 240. The wireless locator signal 240 can convey that a search has been initiated, as well as other information, such as the time that the search was initiated, the identity of the transmitting device, and any other useful information, such as whether or not the first key fob 210 has received information from another component of the system. As described, the wireless locator signal 240 is received by the vehicle 220, but not by the second key fob 230 (which is the lost/misplaced device).

In response to receiving the wireless locator signal 240, the vehicle 220 retransmits the signal as an adjusted wireless locator signal 242. The adjusted wireless locator signal 242 can convey at least some of the information from the wireless locator signal 240. Specifically, the adjusted wireless locator signal 242 can convey that the first key fob 210 transmitted a wireless locator signal 240, the time of the transmission, and the identity of the originally-transmitting device, as well as additional information, such as the time of reception of the wireless locator signal 240 by the vehicle 220, the identity of the transmitting device of the adjusted wireless locator signal 242—here, the vehicle 220—and information conveying that the vehicle 220 has not received either another wireless locator signal 240 or an adjusted wireless locator signal 242 from another component of the system. In addition, the vehicle can operate one or more feedback devices, including a display and/or visible or audible signals, such as flashing of the vehicles headlights, brake lights, warning lights, sounding of the horn, and so on.

The first key fob 210 receives the adjusted wireless locator signal 242 from the vehicle 220 and operates its feedback and/or display to convey to the operator that the vehicle 220 received the wireless locator signal 240, and is operating one or more feedback devices. Additionally, the second key fob 230 receives the adjusted wireless locator signal 242. In response, the second key fob 230 can operate its feedback device, and present certain information on its display. Such information can include the fact that the request was transmitted from the first key fob 210, and relayed by the vehicle 220. Furthermore, the display can also convey that the second key fob 230 received only the adjusted wireless locator signal 242 and not the wireless locator signal 240.

In this example, the first key fob 210, in response to receiving the adjusted wireless locator signal 242, transmits a confirmation signal 246. The confirmation signal 246 can be sent once or repeatedly, as with all other signals of the system 200. The confirmation signal 246 can convey that the adjusted wireless locator signal 242 was received by the first key fob 210. Additionally, the confirmation signal 246 can also convey that the first key fob 210 did not receive a signal from the second key fob 230, as under some circumstances, the first and second key fobs 210, 230 might exchange signals during the search. In that case, the fact of such direct signal exchange could be conveyed with the confirmation signal, and presented as feedback or on a display. Accordingly, the vehicle 220 can learn from the confirmation signal 246 the overall state of the search as known by the first key fob 210; namely that the first key fob 210 is in communication with the vehicle 220. Other components of the system can adjust a confirmation signal to add or remove information indicating which components have already received the confirmation signal. Accordingly, when a last component to receive the confirmation signal does receive it, the information that all other components have received the confirmation signal can allow the last component to not transmit the confirmation signal or adjust and transmit it, as no further components would require the signal.

In some embodiments, the first key fob 210 waits for a predetermined delay period of time is observed prior to transmission of the confirmation signal 246 to permit time for all transmissions between non-initiating devices to propagate. As shown in the illustrated embodiment, the first key fob 210 sends the confirmation signal 246 in response to receiving the adjusted wireless locator signal 242. The first key fob 210 can also send a confirmation signal after receiving the thrice-adjusted wireless locator signal 248, or after both signals, as appropriate to the purpose of transmitting the state of the search to other devices. Under certain circumstances, multiple confirmation signals may be sent during a single search as a result of a signal being received after a certain time has elapsed. The newly-received signal can contain additional information prompting another confirmation signal.

In response to receiving the adjusted wireless locator signal 242, the second key fob 230 can transmit a twice-adjusted wireless locator signal 244. The twice-adjusted wireless locator signal 244 can convey information back to the vehicle 220, including the fact that the second key fob 230 received the adjusted wireless locator signal 244, but not the wireless locator signal 240. Additionally, the twice-adjusted wireless locator signal 244 can convey that the second key fob 230 has or will activate a feedback device to assist an operator in locating it.

The vehicle 220 can retransmit the twice-adjusted wireless locator signal 244 as a thrice-adjusted wireless locator signal 248. The signal 248 can convey the information of the twice-adjusted wireless locator signal 244, as well as additional information conveying that the vehicle 220 is retransmitting the signal, the time of the retransmission, and other information as suitable to the embodiment.

The first key fob 210 can receive the thrice-adjusted wireless locator signal 248 and convey at least some of the information, such as establishment of contact with the second key fob 230 through relay by the intermediary vehicle 220, through methods described above for presenting information. As described, the first key fob 210 can subsequently transmit a confirmation signal 250 containing the status of the search and state of each component known to the first key fob 210. The confirmation signal 250 can be relayed by the vehicle 220 to the second key fob 230; the relayed confirmation signal 252 occurs last in time for this example.

After viewing the information determined by the search, the operator in possession of the first key fob 210 can receive feedback or examine the display to learn that the first key fob 210 has contacted the vehicle 220 through direct signals, and the vehicle 220 is operating a feedback device. Additionally, the first key fob 210 can convey that the second key fob 230 has been contacted as part of the search, and is operating a feedback device. The first key fob 210 can also convey that contact with the second key fob 230 was established only through the intermediary vehicle 220 repeating or relaying transmissions as adjusted signals. Accordingly, the user or operator can infer that the second key fob 230 is within transmission range of the vehicle 220, but not the first key fob 210, and can focus a physical search for the second key fob 230 more narrowly, with the aid of the feedback of the second key fob 230, such as an audible or visual cue or signal.

The confirmation signals 246, 250, 252 preferably convey all information known to each component of the system after waiting a period of time for the search signals to propagate and be exchanged between devices. Additionally, the confirmation signals 246, 250, 252 can be sent in response to new receiving a confirmation signal, thereby distributing the known status of the search to components to which signals must be relayed.

Therefore, as shown any device, such as the vehicle 220 can transmit a confirmation signal, not just the search-initiating device. The known status of the search can include the identity of which component or components have initiated the search, which are in contact with another component or components, whether such contact is direct or through the use of a relay or retransmission of a signal as an adjusted signal, and whether feedback devices have been activated. Preferably, each component of the system 200 receives a confirmation signal, and provides information contained therein for reference, either through variable modes of feedback or presentation of the information on a display of the component.

Each component can also be manipulated to transmit a termination or cancellation signal, which will cause all components to cease producing feedback and only retransmit the cancellation signal, thereby ending the search. In one embodiment, a second pressing of a button used to start the search can cancel it.

As shown in FIG. 3, the second key fob 230 is beyond the range of the first key fob 210, and the key fobs 210, 220 are unable to directly contact each other. The vehicle 220 can relay such contact by virtue of a different, better-accessible physical location, a location with reduced interference, or any other reason. Other permutations and combinations of information exchange and acknowledgment are also possible, as enabled by the components and interoperability of the locator system, and some examples are described below.

Figure 4:
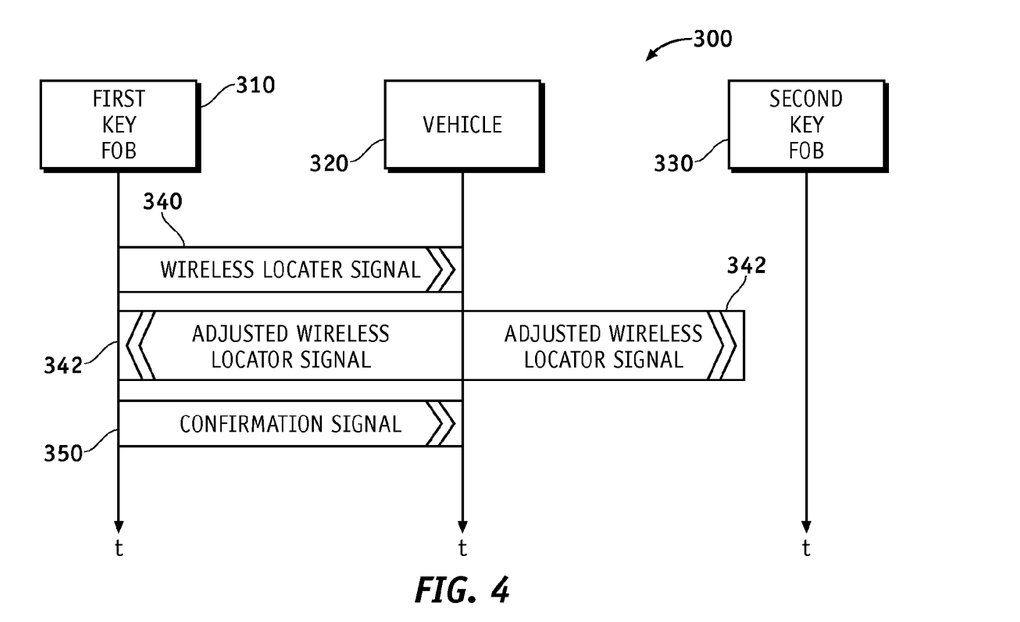
FIG. 4 is a schematic illustration of a sequence of signals corresponding to another embodiment.

FIG. 4 illustrates an example where the second key fob 330 is beyond the transmission range of both the first key fob 310 and the vehicle 320. Unless otherwise specified, the components and numbering of elements are identical to that of FIG. 3, except that the numbers of each have been incremented by 100.

In the illustrated example, the second key fob 330 is out of transmission range of the vehicle 320. Accordingly, because neither wireless locator signal 340 transmitted by the first key fob 310 nor the adjusted wireless locator signal 342 transmitted by the vehicle 320 is received by the second key fob 320. Consequently, the amount of information exchanged is lessened. Additionally, although the vehicle 320 will activate a feedback device and/or present information on a display, the second key fob 330 will do neither and, thus, the operator of the system 300 is not aided in a search for the lost second key fob 330 by such feedback.

FIGS. 5-10 illustrate similar exchanges of information between a component of the system 400 known to the user or operator of the system 400, called the known device 410, to locate another component of unknown whereabouts, called the lost device 430. The third device 420 of each embodiment of the system 400 can be a remaining component, whether its location is known or not. Each component can be any of the wireless devices, such as the key fobs, and the wireless device locator device, whether embodied in a vehicle, or other component, as described above.

Figure 5:
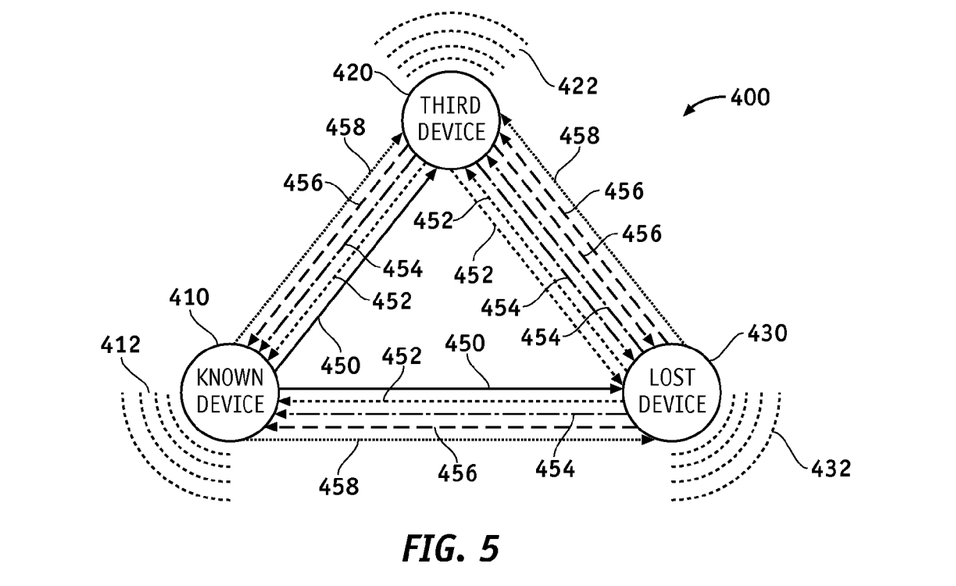
FIG. 5 is a schematic illustration of an exchange of signals corresponding to an embodiment.
Figure 6:
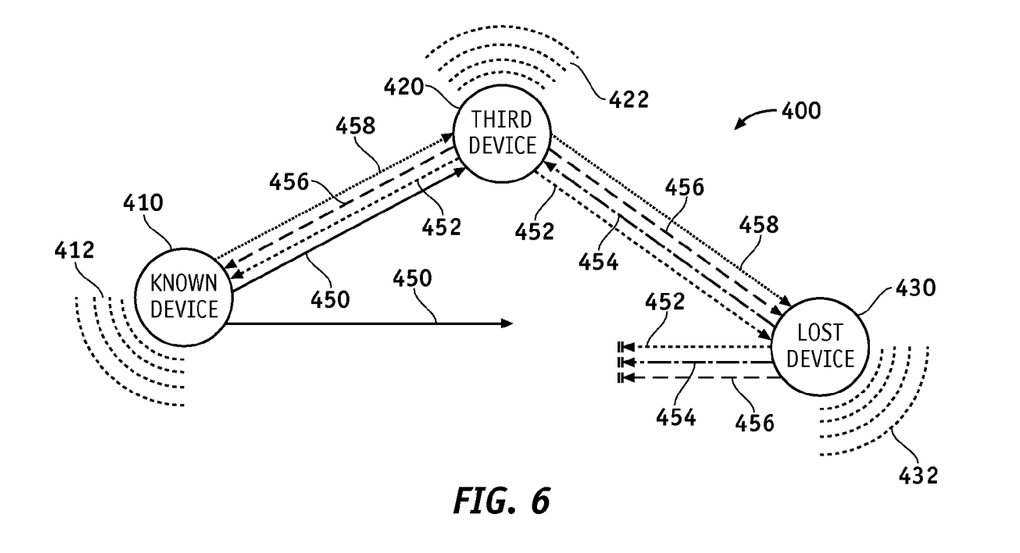
FIG. 6 is a schematic illustration of an exchange of signals corresponding to another embodiment.

FIG. 5 illustrates a situation where each component of the system 400 is in transmission range and capable of sending and receiving signals from each other component. Thus, a search begun by the known device 410 will originate as the transmission of wireless locator signals 450. In response, each of the other components 420, 430 will transmit adjusted wireless locator signals 452, conveying information as described above. Each of the lost device 430 and the third device 420 can operate a feedback device and/or present information on a display as described above in response to either of the wireless locator signal 450, the adjusted wireless locator signals 452, or any subsequent signal, as appropriate to the embodiment. Such feedback or display is illustrated as emissions 412, 422, 432 for the known device 410, third device 420, and lost device 430, respectively.

The known device 410, being in transmission range of the other components, will receive the adjusted wireless locator signal 452 and can present the information that it has contacted both devices and they are also emitting feedback to the user. The known device 410 can transmit a confirmation signal 458 at that time, or delay a predetermined time.

Each of the third device 420 and lost device 430 will retransmit the adjusted wireless locator signal 452 each receives as a twice-adjusted wireless locator signal 452. Additionally, because each of the third and lost devices 420, 430 has received both the wireless locator signal 450 and an adjusted wireless locator signal 452, each device can present information or emit feedback indicating that the device is in communication with both other components of the system 400.

In response to receiving the twice-adjusted wireless locator signal 454, each of the third and lost devices 420, 430 can transmit a thrice-adjusted wireless locator signal 456, communicating to the known device 410 that each component is in contact by direct signal with each other component. Finally, the known device, having determined a successful search, with complete communication between all components and feedback operating for a predetermined time on each, as well as, preferably, presentation of the status on a display of each, can transmit the confirmation signal 458. The confirmation signal 458 can be repeated to each component, conveying the status of the search.

As shown in FIGS. 6-10, various arrangements of the system components can affect the status and success of the search. With respect to FIG. 6, as shown, the lost device 430 can only be reached by relay through the third device 420. Accordingly, a signal sequence similar to FIG. 3 occurs. Thus, the wireless locator signal 450 is only received by the third device 420, which emits feedback 422 and retransmits the signal as the adjusted wireless locator signal 452. The lost device 430, in turn, receives the adjusted wireless locator signal 452, emits feedback 432, and transmits a twice-adjusted wireless locator signal 454. The third device 420 receives the twice-adjusted wireless locator signal 454 and transmits the thrice-adjusted wireless locator signal 456, which is received by the known device 410. The known device 410, now apprised of the status of the search and fact of contact with the lost device 430 only through relay by the third device 430, presents such information to the user and transmits a confirmation signal 458, which is relayed by the known device 410. Although the lost device 430 cannot directly receive signals, it still can transmit in response to those received from the third device 420. If changes in interference or physical positioning permit reception by the known and lost devices 410, 430 for direct signal exchange, such a fact can be conveyed to the user.

Figure 7:
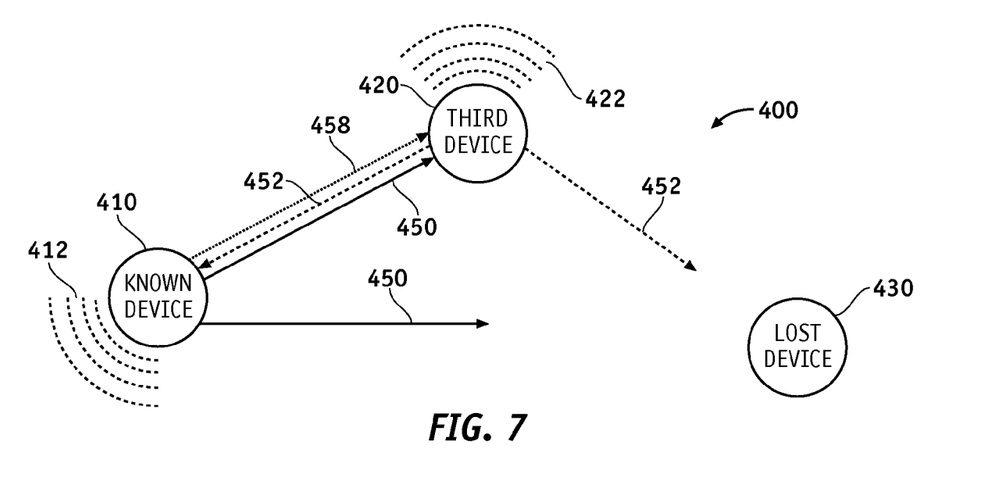
FIG. 7 is a schematic illustration of an exchange of signals corresponding to another embodiment.

FIG. 7 illustrates an arrangement similar to the sequence shown in FIG. 4. Accordingly, the third device 430 can receive the wireless locator signal 450, but the lost device 430 cannot. The third device 430 activates a feedback 432, and transmits the adjusted wireless locator signal 452. After a predetermined period of time, the known device 410 can produce output feedback 412 conveying the status of the search to the user and transmit the confirmation signal 458. The third device 420 can optionally retransmit the confirmation signal 458, or not, as it knows that it has not established communication with any other components besides that from which it received the confirmation signal 458. In some embodiments, when a component receives a confirmation signal 458 as the first received signal, such as if the lost device 430 were brought into range after previous signals, the component can treat the confirmation signal 458 as a wireless locator signal 450, and initiate a response, prompting a new exchange of signals as if a search had been begun again. Thus, the system 400 can robustly update the status of the search, should a component belatedly respond to one or more signals of the search.

Figure 8:
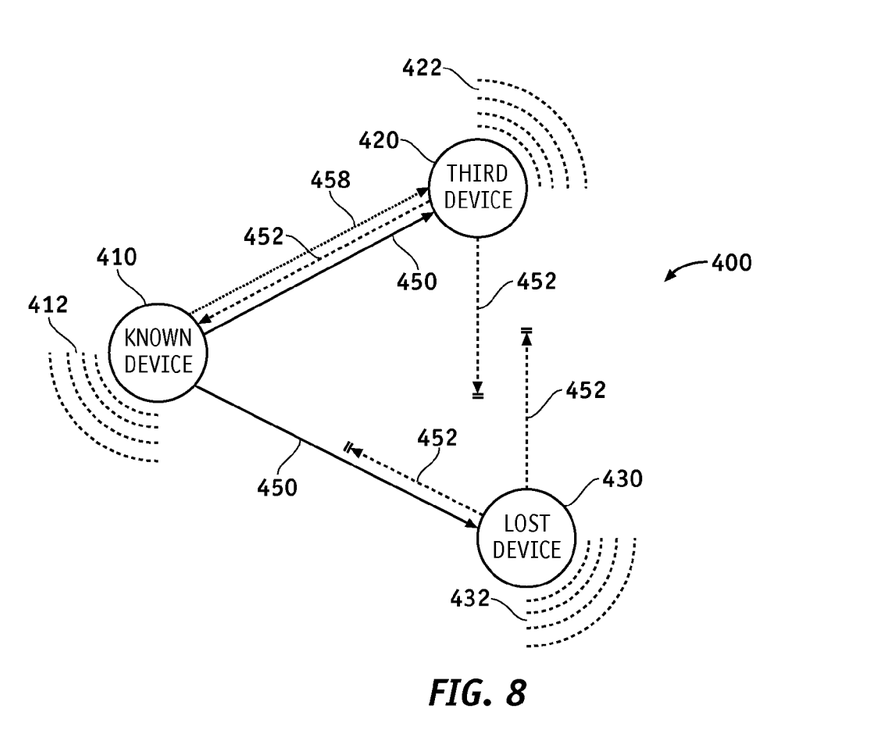
FIG. 8 is a schematic illustration of an exchange of signals corresponding to another embodiment.

FIG. 8 illustrates an arrangement of the system 400 wherein the lost device 430 is capable of receiving signals from the known device 410 and not the third device 420, and is prevented or inhibited from communicating directly with either. As can be seen, the lost device 430 will still produce feedback 432 in response to receiving the wireless locator signal 450, even if it receives no further signals. After a predetermined period of time, the feedback 432 can cease.

Figure 9:
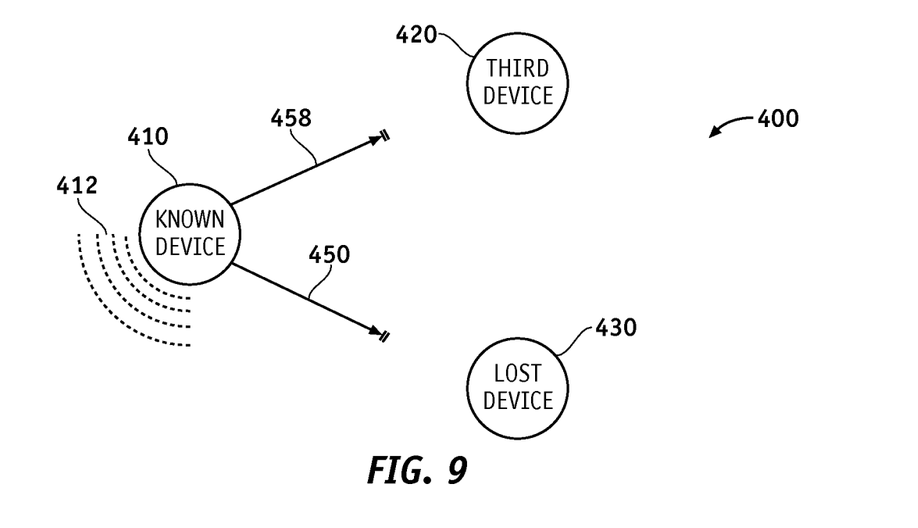
FIG. 9 is a schematic illustration of an exchange of signals corresponding to another embodiment.

FIG. 9 illustrates an embodiment wherein neither the third device 420 nor lost device 430 is capable of receiving signals from the known device 410. Accordingly, neither will produce feedback or signals. The known device 410 can, however, convey the status of the search through its display or feedback 412 to permit the user to know that neither other component is transmitting signals received by the known device 410. This could result because neither the third or lost devices 420, 430 receive the wireless locator signal 450, as shown. It could, however, also result because, although the signal 450 was received by one or more of the other devices 420, 430, the known device 410 is not within the broadcast range of either other device 420, 430, for any reason. Accordingly, the user will know to change their location, but not the exact status of the search.

Figure 10:
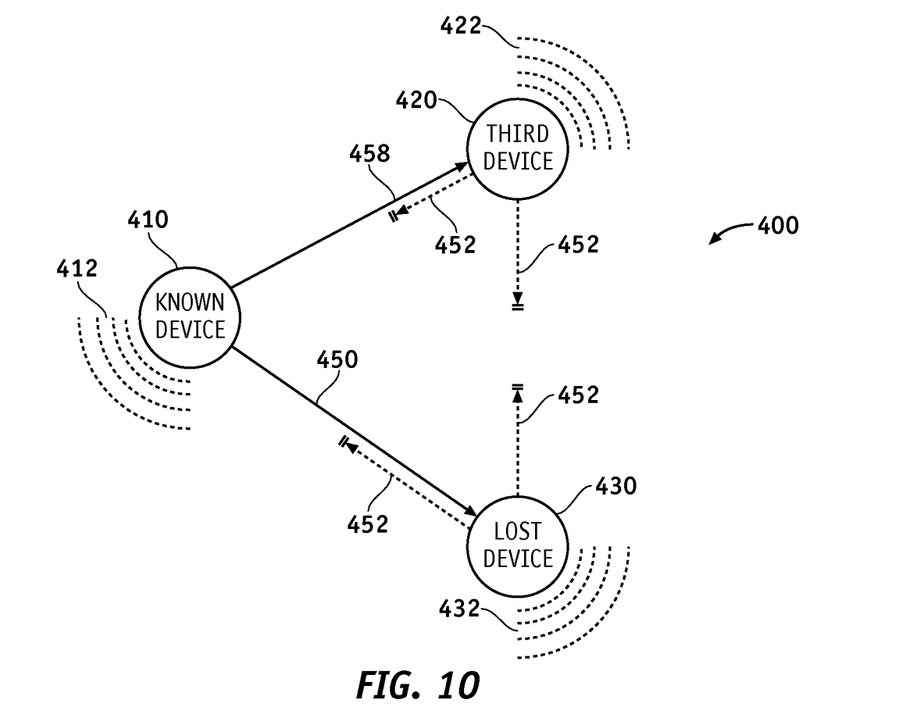
FIG. 10 is a schematic illustration of an exchange of signals corresponding to another embodiment.

In FIG. 10, each of the third and lost devices 420, 430 receive the wireless locator signal 450, and activate feedback devices, but are unable to reach the known device 410 with a transmitted adjusted wireless locator signal 452 for reasons of range, interference, and the like. Accordingly, a user may still detect and be aided by feedback 422, 432 from the third or lost devices 420, 430 even though the fact that those devices received the wireless locator signal 450 is not reported to the operator of the known device 410.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents the time of filing this patent application.

What is claimed is:

1. A method of exchanging information to locate a key fob, the method comprising:
    transmitting a wireless locator signal from a first portable wireless device, the wireless locator signal conveying the identity of the first portable wireless device; and
    receiving a first once-adjusted wireless locator signal from a distant wireless device locator system, the first once-adjusted wireless locator signal comprising at least some information conveyed in the wireless locator signal.

2. The method of claim 1, wherein the first portable wireless device further comprises a feedback device and the method further comprises operating the feedback device in response to receiving the first once-adjusted wireless locator signal.

3. The method of claim 1, wherein the first once-adjusted wireless locator signal conveys the identity of the distant wireless device locator system.

4. The method of claim 1, wherein the first portable wireless device comprises a display and the method further comprises operating the display to convey an indicator derived from information contained in the first once-adjusted wireless locator signal.

5. The method of claim 1, further comprising receiving a thrice-adjusted wireless locator signal from the distant wireless device locator system, the thrice-adjusted wireless locator signal comprising at least some information conveyed in the wireless locator signal and the once-adjusted wireless locator signal.

6. The method of claim 1, further comprising receiving a second once-adjusted wireless locator signal from a second portable wireless device, the second once-adjusted wireless locator signal comprising at least some information conveyed in the wireless locator signal.

7. The method of claim 6, wherein the first portable wireless device comprises a display and the method further comprises operating the display to convey an indicator derived from information contained in the first and second once-adjusted wireless locator signals.

8. The method of claim 1, further comprising transmitting a confirmation signal from the first portable wireless device in response to receiving the first once-adjusted wireless locator signal, the confirmation signal conveying an indication of reception of the first once-adjusted wireless locator signal.

9. A method of locating portable wireless devices comprising:
    receiving a wireless locator signal with a first portable wireless device comprising a feedback device, the wireless locator signal conveying information including the identity of a remote wireless locator system;
    determining the identity of the remote wireless locator system from the wireless locator signal; and
    operating the feedback device, in response to receiving the wireless locator signal, to generate feedback that identifies the remote wireless locator system.

10. The method of claim 9, further comprising transmitting a once-adjusted wireless locator signal conveying the identity of the first portable wireless device, notification of reception of the wireless locator signal, and at least some information conveyed in the wireless locator signal.

11. The method of claim 9, further comprising receiving a once-adjusted wireless locator signal from a second portable wireless device, the once-adjusted wireless locator signal containing information including the identity of the second portable wireless device and at least some information conveyed in the wireless locator signal.

12. The method of claim 11, further comprising transmitting a twice-adjusted wireless locator signal with the first portable wireless device, the twice-adjusted wireless locator signal conveying the identity of the first portable wireless device, notification of reception of the once-adjusted wireless locator signal, and at least some information conveyed in the wireless locator signal and the once-adjusted wireless locator signal.

13. The method of claim 11, further comprising operating the feedback device in response to receiving the once-adjusted wireless locator signal.

14. The method of claim 9, wherein the remote wireless locator system is disposed in a key fob associated with a vehicle.

15. The method of claim 9, wherein the remote wireless locator system is disposed in a vehicle.

16. A method of locating a key fob associated with a vehicle comprising a remote device locator system, the method comprising:
    transmitting a wireless locator signal from a first key fob in response to manipulation of a first manual input device of the first key fob;
    receiving a first once-adjusted wireless locator signal from a second key fob, the first once-adjusted wireless locator signal including the identity of the second key fob and at least some information conveyed in the wireless locator signal; and
    operating a first feedback device of the first key fob in a first mode in response to receiving the first once-adjusted wireless locator signal.

17. The method of claim 16, further comprising operating a second feedback device of the second key fob in response to receiving the wireless locator signal.

18. The method of claim 16, further comprising receiving a second once-adjusted wireless locator signal from the remote device locator system, the second once-adjusted wireless locator signal including the identity of the remote device locator system and at least some information conveyed in the wireless locator signal.

19. The method of claim 18, further comprising operating the first feedback device in a second mode in response to receiving the second once-adjusted wireless locator signal.

20. The method of claim 16, further comprising receiving a twice-adjusted wireless locator signal from the second key fob, the twice-adjusted wireless locator signal including the identity of the second key fob and at least some information conveyed in the first once-adjusted wireless locator signal.

* * * * *